(12) United States Patent
Kubli

(10) Patent No.: US 7,891,058 B2
(45) Date of Patent: Feb. 22, 2011

(54) ELASTIC CORD WITH ADJUSTABLE LOOP

(75) Inventor: Ronald N. Kubli, 5743 McLoughlin Dr., Central Point, OR (US) 97502

(73) Assignee: Ronald N. Kubli, St. Petersburg, FL (US)

( * ) Notice: Subject to any disclaimer, the term of this patent is extended or adjusted under 35 U.S.C. 154(b) by 572 days.

(21) Appl. No.: 11/904,131

(22) Filed: Sep. 27, 2007

(65) Prior Publication Data

US 2009/0083947 A1   Apr. 2, 2009

(51) Int. Cl.
*F16G 11/00* (2006.01)
(52) U.S. Cl. ............... 24/115 H; 24/129 R; 114/230.2; 114/230.21
(58) Field of Classification Search ............ 24/300, 24/301, 129 R, 265 CD, 265 BC, 265 EC, 24/265 R, 115 H, 3.3; 403/212, 306; 114/230.2, 114/230.26
See application file for complete search history.

(56) References Cited

U.S. PATENT DOCUMENTS

| | | | | |
|---|---|---|---|---|
| 314,813 A * | 3/1885 | Perris | ................... | 24/481 |
| 1,505,553 A * | 8/1924 | Gilmore | ................... | 403/209 |
| 2,835,012 A * | 5/1958 | Reiter | ................... | 403/212 |
| 2,983,976 A * | 5/1961 | Ehmann | ................... | 403/212 |
| 3,012,736 A * | 12/1961 | Brust | ................... | 242/375.1 |
| 3,094,755 A * | 6/1963 | Casanave | ................... | 24/129 R |
| 3,490,106 A * | 1/1970 | Dohmeier | ................... | 403/212 |
| 3,827,790 A * | 8/1974 | Wenzel | ................... | 351/123 |
| 4,026,549 A * | 5/1977 | Gunn | ................... | 482/124 |
| 4,059,866 A * | 11/1977 | Rohland | ................... | 16/108 |
| 4,109,603 A * | 8/1978 | Guthmann | ................... | 114/230.29 |
| 4,136,987 A * | 1/1979 | Tettamanti | ................... | 403/212 |
| 4,270,492 A * | 6/1981 | Goheen | ................... | 119/793 |
| 4,364,538 A * | 12/1982 | Tomlinson | ................... | 248/495 |
| 4,573,204 A * | 2/1986 | Polett | ................... | 383/41 |
| 4,665,590 A * | 5/1987 | Udelhofen et al. | ......... | 24/115 H |
| 4,864,695 A * | 9/1989 | Gold | ................... | 24/713.2 |
| 4,912,816 A * | 4/1990 | Brandt | ................... | 24/129 R |
| 4,955,750 A * | 9/1990 | Goran | ................... | 403/306 |
| 5,033,169 A * | 7/1991 | Bindon | ................... | 24/129 R |
| 5,113,551 A * | 5/1992 | Roberts | ................... | 24/115 A |
| 5,317,788 A * | 6/1994 | Esposito et al. | ............... | 24/300 |
| 5,351,367 A * | 10/1994 | Kennedy et al. | .......... | 24/129 R |
| 5,394,592 A * | 3/1995 | Quick | ................... | 24/16 R |
| 5,465,466 A * | 11/1995 | Napier | ................... | 24/3.3 |
| 5,586,514 A * | 12/1996 | Yuscavage | ............. | 114/230.26 |
| 5,870,963 A * | 2/1999 | Alan | ................... | 114/230.21 |
| 6,036,066 A * | 3/2000 | Giacona, III | ............. | 224/148.6 |
| 6,089,008 A * | 7/2000 | Lucius | ................... | 57/25 |
| 6,622,358 B1 * | 9/2003 | Christy | ................... | 24/712.9 |
| 6,681,459 B1 * | 1/2004 | Curet et al. | ................... | 24/712 |

* cited by examiner

*Primary Examiner*—Robert J Sandy
*Assistant Examiner*—Rowland D Do

(57) ABSTRACT

A restraint of elastic cord includes a loop for securement about a fixed object. A lock on the cord is positionable therealong to vary loop size. Tensioning of the cord by momentarily applied manual force permits positioning of the lock along the cord.

4 Claims, 2 Drawing Sheets

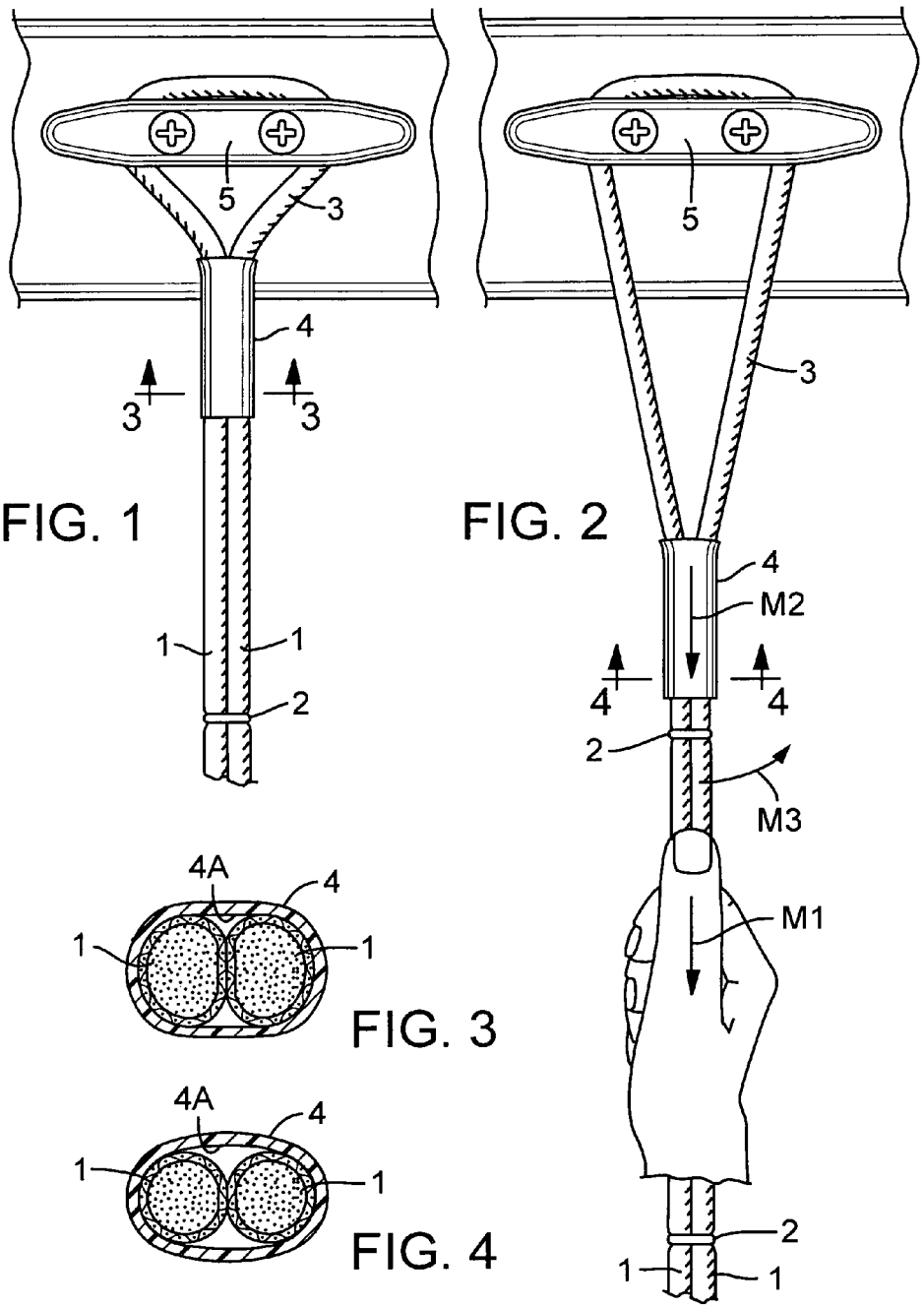

ELASTIC CORD WITH ADJUSTABLE LOOP

BACKGROUND OF THE INVENTION

The present invention concerns the provision of a cord-like restraint for attachment to a support in a secure, rapid, manner without reliance on tying of a knot.

The temporary securement of a smaller or recreational type boat to a dock incurs some reliance on knot tying ability. Poorly tied knots in a mooring line for a boat subject to wave and tidal action, can result in damage or even loss of the boat. Owners, as well as guests, often lack the ability to safely moor a boat. The use of mechanical devices in the mooring of a recreational boat is impractical.

The known art discloses clamps for general use with elastic cords, as in U.S. Pat. No. 5,345,656 to form a loop in a cord and utilizing a cord in stretched engagement with a clamp to form a loop.

Another cord lock is shown in U.S. Pat. No. 6,189,186 wherein the lock is of elastomeric material with cords laterally displaceable to lock and release cord segments.

U.S. Pat. No. 4,912,816 discloses a handgrip about mooring line segments, to facilitate imparting slack to a line for line removal from a post, column or the like.

U.S. Pat. No. 6,618,910 shows a molded device for clamped engagement with doubled rope segments to prevent slippage of either segment.

SUMMARY OF THE INVENTION

An elastic restraint is provided with a slideable lock sleeve thereon, engageable with joined segments of the restraint, to permit sizing of a loop.

The restraint is of double elastic cord joined by clips spaced therealong with reduction of loop size, after placement, assuring cleat engagement until re-sizing of the loop for removal from the cleat or other fixed object.

A manually positioned lock carried by the cord component permits sizing of the loop by the persons in a mooring operation. The lock and the cord component cooperate to permit manual lock displacement and subsequently to resist all but intentionally applied forces. Momentary tensioning of the cord component reduces cord cross section to permit manual positioning of the lock and sizing of the loop.

BRIEF DESCRIPTION OF THE DRAWINGS

In the drawings:

FIG. 1 is a plan view of the cord component operatively disposed on a cleat;

FIG. 2 is a view similar to FIG. 1 with the cord component tensioned during removal from a cleat.

FIG. 3 is a sectional view taken along line 3-3 of FIG. 1;

FIG. 4 is a sectional view taken along line 4-4 of FIG. 2; and

DETAILED DESCRIPTION OF THE PREFERRED EMBODIMENTS

Figure 5:
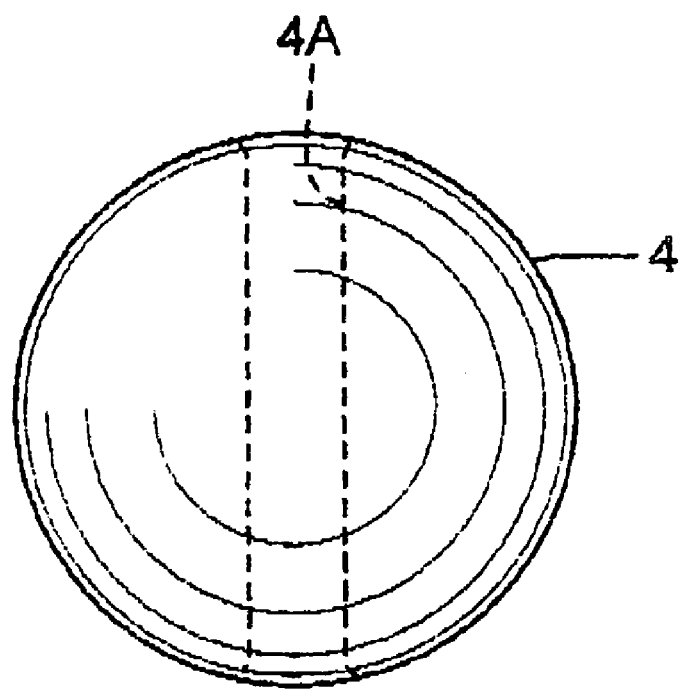
FIGS. 5-7 are side elevational views of different cord locks.
Figure 6:
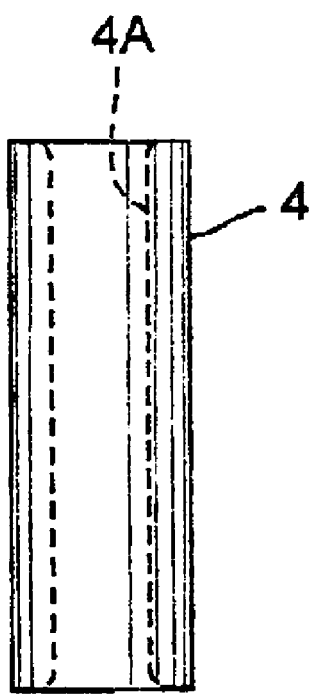
Figure 7:
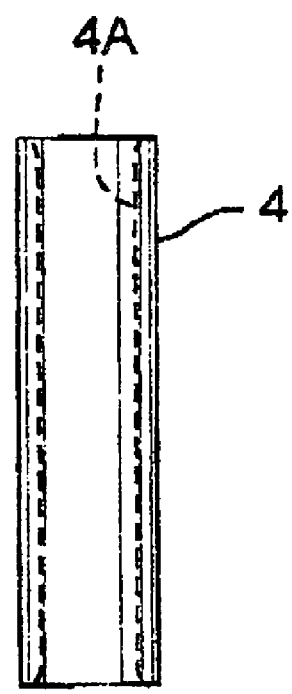

With reference to the drawings, the reference numeral 1 indicates a cord of elastomeric construction shown with clips or bands 2 spaced therealong joining runs of the cord.

On at least one end of the doubled cord component is a loop 3, of variable size, as determined by a lock 4. Elastic shock cord with multiple elastic strands and a protective woven fabric covering is suitable for the cord. Doubled, ⅜-inch diameter cord is suitable for use in the mooring of most recreational or small boats.

Lock 4 is manually positioned during installation and removal from a cleat at 5 or other fixed object. A locking feature is provided by an internal wall 4A of the lock defining a cross sectional area and providing a surface which normally firmly engages doubled cord 1. During mooring, advancing of lock 4 along a tensioned cord component toward the cleat reduces the size of loop 3 to seat about the cleat or other fixed object. Release of cord component 1 returns the cord to a non-tensioned state and frictional engagement with lock 4 per FIG. 3.

For loop disengagement from a fixed object, manual force applied in the direction of arrow M1 which serves to reduce the cross section of cord component 1 with subsequent manual force, imparted to lock 4 in the direction of arrow M2. With tensioning of the cord component, finger applied force moves the lock in the direction of arrow M2. While maintaining tension loop 3 is reorientated in the direction of arrow M3 with lifting of the loop resulting in loop release from the cleat or other fixed object.

Lock 4 may be of rigid or semi-rigid construction with internal wall 4A defining an opening of a cross section providing frictional engagement with cord 1 when in a relaxed or normal state.

While I have shown but one embodiment of the invention, it will be apparent to those skilled in the art that the invention may be embodied still otherwise without departing from the spirit and scope of the claimed invention.

Having thus described the invention, what is desired to be secured by a Letters Patent is:

I claim:

1. An elastic mooring device for attachment to a fixed object and including:
   an elastic cord having parallel segments and a woven fabric cover,
   couplings on said cord at intervals along said parallel segments,
   a segment of the elastic cord forming a loop, and
   a lock on said parallel segments and positionable thereong when the parallel segments are in a tensioned state to determine the size of the loop to accommodate a fixed object, said lock having an opening therethrough defined by a wall surface for frictional locked engagement with the parallel segments when in a non-tensioned state,
   said parallel segments when manually tensioned to the tensioned state are of reduced cross section from an original cross section when the parallel segments are non-tensioned, enabling manual positioning of the lock.

2. The elastic mooring device claimed in claim 1 wherein said elastic cord comprises multiple elastic strands.

3. The elastic mooring device claimed in claim 1 wherein the cross sections of the parallel segments vary inversely with the tension applied to the segments to permit manual positioning of the lock to vary loop size.

4. The elastic mooring device claimed in claim 1 wherein said couplings are crimped metal bands.

* * * * *